US008454420B1

(12) United States Patent
Weiss

(10) Patent No.: US 8,454,420 B1
(45) Date of Patent: *Jun. 4, 2013

(54) CASINO WAGERING GAME WITH BONUS SUITS

(75) Inventor: Brent Weiss, Bellmore, NY (US)

(73) Assignee: Money$uit Industries LLC, Bellmore, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,343

(22) Filed: May 13, 2012

Related U.S. Application Data

(63) Continuation of application No. 12/651,232, filed on Dec. 31, 2009, now Pat. No. 8,181,962.

(60) Provisional application No. 61/158,353, filed on Mar. 7, 2009.

(51) Int. Cl.
*A63F 13/00* (2006.01)
*A63F 1/00* (2006.01)

(52) U.S. Cl.
USPC .......................... 463/12; 273/292; 273/138.2

(58) Field of Classification Search
USPC ................. 463/12; 273/292, 274, 309, 138.2
See application file for complete search history.

(56) References Cited

U.S. PATENT DOCUMENTS

| | | | | |
|---|---|---|---|---|
| 6,575,466 | B1 * | 6/2003 | Lizak | 273/292 |
| 7,093,833 | B1 * | 8/2006 | Horning | 273/274 |
| 7,329,178 | B1 * | 2/2008 | Moore et al. | 463/12 |
| 2002/0153663 | A1 * | 10/2002 | Hodge | 273/292 |
| 2007/0132183 | A1 * | 6/2007 | Moses | 273/292 |

* cited by examiner

*Primary Examiner* — Benjamin Layno
(74) *Attorney, Agent, or Firm* — Muskin & Cusick LLC

(57) ABSTRACT

A casino wagering game based on the card game of thirty-one. Each player is dealt three cards and the goal is to get as high of a hand as possible. Each player is allowed the option to replace one selected card. A bonus suit can be determined randomly, and if the player's hand is formed using the bonus suit then the player is entitled to playing benefits. The player benefits can include the ability to win on ties as well as receiving bonus payouts on hands.

20 Claims, 5 Drawing Sheets

CASINO WAGERING GAME WITH BONUS SUITS

CROSS REFERENCE TO RELATED APPLICATIONS

This application is a continuation application of application Ser. No. 12/651,232 filed Dec. 31, 2009, now U.S. Pat. No. 8,181,962 issued May 22, 2012, which claims benefit to provisional application 61/158,353 filed Mar. 7, 2009, both applications of which are incorporated by reference herein in its entirety for all purposes.

BACKGROUND OF THE INVENTION

1. Field of the Invention

The present inventive concept relates to a casino wagering game which can be played in table or electronic form.

2. Description of the Related Art

The card game of Thirty-one (also known as Scat) is a card game played between at least two players. Each player is dealt three cards and the goal is to obtain a point value closest to 31 of the same suit.

Horning, U.S. Pat. No. 7,093,833, describes a version of Thirty-one that can be played in a casino. The player can be dealt an initial two cards and then places another wager in order to receive the third card.

Casino wagering games are a big industry and casinos are always interested in new games that will provide exciting and profitable game play for the players. What is needed is a variant of the Thirty-one game that can be offered by a casino.

SUMMARY OF THE INVENTION

It is an aspect of the present invention to provide an exciting wagering game.

The above aspects can be obtained by a method that includes (a) providing a physical deck of cards; (b) receiving an ante wager from a player; (c) dealing a hand of cards to the player; (d) determining a point total of the hand, the point total being determined by adding card values in the hand of a same suit to determine each suit's point total and using a highest point out of each suit's point total; and (e) paying the player a payout based on the point total.

The above aspects can also be obtained by a method that includes (a) providing a physical deck of cards; (b) receiving a pot wager from at least two players which all comprise a pot; (c) dealing a hand of cards to each of the at least two players; (d) determining a bonus suit randomly; and (e) determining a point total for each hand, the point total being determined by adding card values in each hand of a same suit to determine each suit's point total and using a highest point out of each suit's point total for each hand; (f) determining winning player(s) which are the player(s) with a highest point total, wherein if two or more players have the highest point total, then eliminating players with the highest point total whose hands do not use the bonus suit; and (g) awarding the pot to all remaining player(s) with the highest point total, if there is more than one remaining player with the highest point total then the pot is divided equally among remaining players.

The above aspects can also be obtained by an electronic gaming device that includes (a) an output device; (b) a processing unit, executing instructions to perform the following operations: receiving a pot wager from at least two players which all comprise a pot; (c) dealing and displaying on the output device a hand of cards to each of the at least two players; (d) determining a bonus suit randomly; (e) determining a point total for each hand, the point total being determined by adding card values in each hand of a same suit to determine each suit's point total and using a highest point total out of each suit's point total for each hand; (f) determining winning player(s) which are the player(s) with a highest point total, wherein if two or more players have the highest point total, then eliminating players with the highest point total whose hands do not use the bonus suit; and (g) awarding the pot to all remaining player(s) with the highest point total, if there is more than one remaining player with the highest point total then the pot is divided equally among remaining players.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
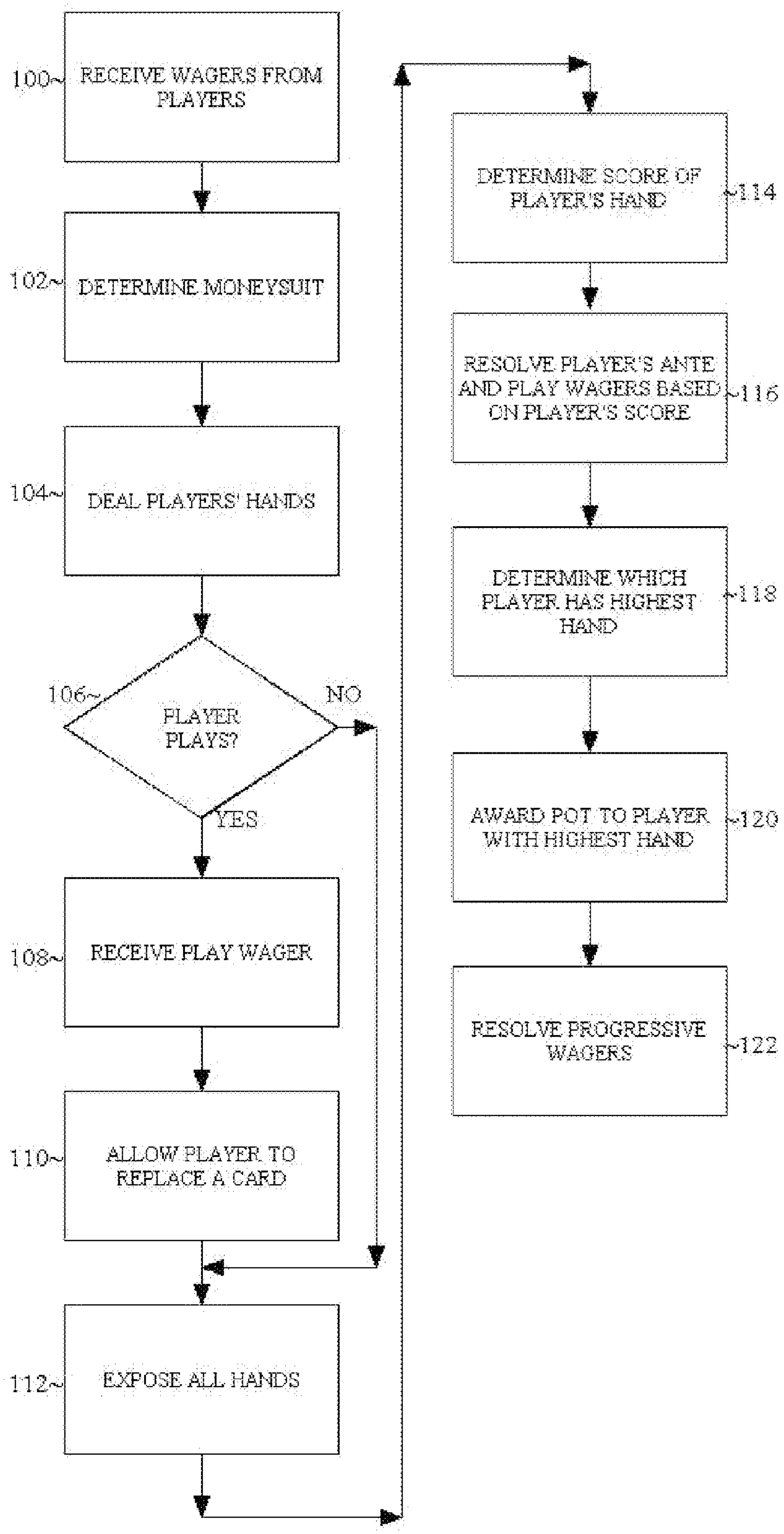
FIG. 1 is a flowchart illustrating an exemplary method of implementing a wagering game, according to an embodiment.

Reference will now be made in detail to the presently preferred embodiments of the invention, examples of which are illustrated in the accompanying drawings, wherein like reference numerals refer to like elements throughout.

The present general inventive concept relates to a method, system, and computer readable storage which allows a casino (or house) to offer a wagering game to players. The wagering game is generally played as follows. Each player places an ante wager and a pot wager. Each player is then dealt three cards from a standard 52 card deck of cards. The player can review their cards and select a card to discard which is replaced from a newly dealt card from the deck, although the player can also choose to keep his or her initial three cards and not replace a card. Each numbered card counts as its point value, while jack, queen and king also count as 10. Aces count as 11. Three of a kind counts as 30.5, regardless of the values of the cards that form the three of a kind.

Only cards of like suit will count towards the point total. The hand will be worth (scored as) the highest point total possible of a single suit. For example, if the player is dealt a nine clubs/ace hearts/ten hearts, the player's point total is 21. This is because the nine of clubs does not count since clubs is a different suit than hearts. The same hand could also count as nine (ignoring the hearts), but since 9 is less than 21 and the goal is to make the highest point total possible, then the hand is worth 21 points based on the cards with the suit of hearts. As another example, suppose the player is dealt nine hearts/three clubs/four clubs. The hand is scored as 9 since the cards of suit hearts (total 9) is higher than the cards of suit clubs (total 7). This hand can be said to be "formed using hearts" or "formed in hearts" or "possesses hearts" or "uses hearts" etc.

The goal is to score as high of a point total as possible. The highest possible total is 31. So as between two hands, the player with the higher point total (point total closest to 31) wins.

A pot wager can also be placed before the deal, wherein all players place their pot wager into a pot, and at the end of the game, the player (that placed the pot wager) with the highest scoring hand wins. The pot wager would not be available if only one player is playing at the table.

A "money suit" (or "preferred suit" or "bonus suit") can be chosen randomly by the house (e.g., using a random number generator such as an electronic random number generator, dice a wheel, etc.) When the winner of the pot wager is being determined, if there are any ties they are broken based on the player that has the money suit. For example, if the money suit is diamonds, and two players at the table tie for the highest point total, then if one of these players has their score in diamonds (the cards used for the point total are of the diamonds suit) then this player wins over the other player.

A progressive wager can also be made before the deal, and is paid based on each player's initial three cards. Alternatively, the progressive wager can be paid on the player's final hand after the player has replaced a chosen card.

FIG. 1 is a flowchart illustrating an exemplary method of implementing a wagering game, according to an embodiment.

The method can begin with operation 100, which receives wagers from each of the players. Multiple players can play the game simultaneously at the same table. Each player must place an ante wager and a pot wager (although in an alternative embodiment the player may only place one of these bets). The ante wager and pot wager must be of equal value, although in an alternative embodiment they do not have to be of equal value. These wagers can be made as known in the art, by placing chips (which can be directly redeemable for cash at a cashier) or cash on a betting circle on a felt layout used for the game. The player can optionally place a progressive wager as well, which can be placed by inserting a dollar chip (or chip or coin of another denomination) into a slot which registers that the player has made the progressive bet. The progressive wager/jackpot is of the kind described in U.S. Pat. No. 6,234,895, which is incorporated by reference herein in its entirety.

From operation 100, the method proceeds to operation 102, which determines the money suit. This can be done by pressing a button on an electronic random number generator which will pick one of the four suits (diamonds, spades, clubs, hearts) at random and display the chosen suit. The chosen suit can be displayed in a number of ways, such as on an electronic LED in the center or the table, or an electronic sign. Alternatively, the money suit can be chosen by spinning a wheel which shows four suits, and where the wheel stops is the suit that is chosen as the money suit. Any other known technique can be used to choose the money suit.

From operation 102, the method proceeds to operation 104, which deals all of the players' hands. Each player is dealt three cards face down, although each player is permitted to look at their own cards. Collaboration (looking at another player's cards) is typically not allowed.

From operation 104, the method proceeds to operation 106, wherein the player determines whether the player wishes to play or fold. If the player wishes to fold, then the player will forfeit his or her ante bet (which will be collected by the dealer) and then the method proceeds to operation 112.

If in operation 106, the player decides to play, the method proceeds to operation 108, which receives the player's play wager. The play wager should typically be equal to the ante wager, although in another embodiment the player wager does not have to be equal to the ante wager.

From operation 108, the method proceeds to operation 110, which allows the player to replace a card. The player will select which (if any) of the player's initial three cards (dealt in operation 104) the player wishes to replace (the discard), and the player can place this card in a special area on the players betting layout. The dealer will then take the player's discard and deal the player a new card from the deck which the player can look at which forms the player's final three card hand. The card the player chooses to replace will of course depend on the hand. For example, if the player has a 10-hearts-ace-hearts-10 clubs, the player would naturally want to discard the 10-clubs since it does not match the other suit of hearts and the player would hope to draw a high valued heart card.

Operations 106-110 will be repeated for each player at the table.

Once all the players have had a chance to play/fold (and replace their chosen discard if they play), then the method proceeds to operation 112, which exposes all hands to all players. At this point the resolution of the game is deterministic, as the evaluation of all payouts is based on the revealed information.

From operation 112, the method proceeds to operation 114, which determines the numerical score (also known as total or point total) of each player's hand. This is determined as described herein. All values of each same suited card in the three card hand are totaled, and the highest point total possible that can be made is the hand's score. If the hand is three of a kind, then the score is automatically a 30.5.

From operation 114, the method proceeds to operation 116, which resolves each player's ante wager and play wager based on the player's hand's score.

TABLE I

| Event | Play wager payouts | Ante wager payouts | Ante bonus | Units paid |
|---|---|---|---|---|
| Lose | −1 | −1 | none | −2 |
| 18-23 | 1:1 | 1:1 | none | 2 |
| 24-27 | 2:1 | 1:1 | none | 3 |
| 28-29 | 5:1 | 1:1 | none | 6 |
| 30 | 10:1 | 1:1 | none | 11 |
| Trips | 13:1 | 1:1 | none | 14 |
| 31 | 20:1 | 1:1 | 5:1 | 26 |
| M$ 31 | 35:1 | 1:1 | 10:1 | 46 |
| M$ Mini-Royal | 100:1 | 1:1 | 20:1 | 121 |

For example, if the player has a point total of under 18, the player loses both his or her ante wager and his or her play wager. If the player has a point total of 18, then the player wins even money on both the ante wager and the play wager. If the player has a point total of 31, then the player wins a payout of twenty times their play wager and six times their ante wager (an even money win on the ante wager plus a bonus of five times). So for example, if the player bet $1 on the ante wager and $1 on the play wager, and the player received a point total of 31 (but not of the money suit) then the player would win a $20 payout on the play wager and a $6 payout on the ante wager for a total payout of $26 which does not include the players original $2 wagers which the player also keeps, so in total the player will take away $28 in chips after this transaction.

If the player gets a point total of 31 in the same suit that has been chosen (in operation 102) as the money suit (designated as "M$") then the player is paid a payout of 46 times the amount of the ante wager (which would typically equal the play wager). In Table I, the "M$ mini-royal" pays when the player has a mini-royal (suited ace, king, and queen) of the same suit that is the money suit (chosen by the house in operation 102).

As known in the art, losing wagers are taken from the player by the dealer and the dealer also pays out winning wagers (typically in chips) to the player.

Operations 114-116 are repeated for each live player at the table (each player that did not fold in operation 106).

From operation 116, the method proceeds to operation 118, which then determines which player (out of the players that have made the pot wager) has the highest scoring hand in order to win the pot. If there are any ties, then the money suit is used to attempt to break the tie. If two (or more) hands tie, then the hand (if any) which is formed using the money suit is the winning hand. If no hand is formed using the money suit, then the players with the tying hands will split the money pot. If two (or more) hand ties that are all formed using the money suit, then these hands will all split the pot. If there is a tie between hands which are formed using the money suit and those which are not formed using the money suit, then the hands formed using the money suit will split the pot.

Also note that in the event of a tie of three of a kind (point total of 30.5), then the hand formed using the highest rank wins (aces will always count as high). For example, three fours will beat three twos. The money suit is not relevant for hands of three of a kind.

From operation 118, the method proceeds to operation 120 which awards the pot (the collection of all of the players' pot wagers placed in operation 100) to the player determined in operation 118 to have the highest hand. If it was determined that a tie has occurred which results in the pot being split between these players, then the pot is divided among these players.

From operation 120, the method proceeds to operation 122, which resolves each player's progressive (also known as jackpot) wagers. The progressive wager (if placed) is paid based if the player gets a predetermined initial hand (e.g., a mini-royal using the money suit) which pays a progressive jackpot. The progressive jackpot is fed by the progressive jackpot wagers, although the house would typically take out a fixed percentage of each jackpot wager before feeding the rest into the progressive jackpot (e.g., the progressive jackpot bet is a fixed $1 bet, and for each $1 bet, the house keeps 10 cents, or any other amount). Any winning progressive wager is paid while any losing progressive wager is collected (or would have been collected immediately after operation 100).

Table II below illustrates one sample paytable for the progressive jackpot. Of course, other payouts can be used as well. If the player has a point total of 31 not using the money suit (the three cards are of a different suit than the bonus/money suit determined in operation 102) then the progressive would pay a fixed $250. If the point total of 31 is made wherein all three cards are the bonus/money suit (determined in operation 102), then the progressive would pay 10% of the current progressive amount and the current progressive amount would be reduced by 10%. If the player gets a mini-royal (suited queen, king, ace) that is not of the bonus/money suit (determined in operation 102), then this just counts as a 31 not using the money suit wherein the player wins $250. If the player gets a mini-royal using the bonus/money suit (determined in operation 102), then the player wins the entire progressive, and the progressive would be reset to a seed amount. Otherwise, the player has lost the progressive wager.

TABLE II

| event | pays |
|---|---|
| 31(not using money suit) | $250(fixed amount) |
| 31(using money suit) | %10 of progressive |
| mini-royal (using money suit) | %100 of progressive |
| all others | 0 |

At this point, the game is over. All wagers should have been resolved (collected or paid). The cards can be collected and reshuffled in a shuffling machine (or by hand), and a new game can begin back at operation 100.

It is noted that the order of operations in FIG. 1 can occur using any operable orders as well. For example, operation 102 can be performed before or after operation 112. Operations 118-120 can be performed before operation 116. Any other variants of the order of operations are included within the scope of FIG. 1.

As illustrated above, the money suit is important to help resolve ties for the pot wager, to award players special bonuses on the ante, play wagers, and to also award players a jackpot on the progressive wager.

Figure 2:
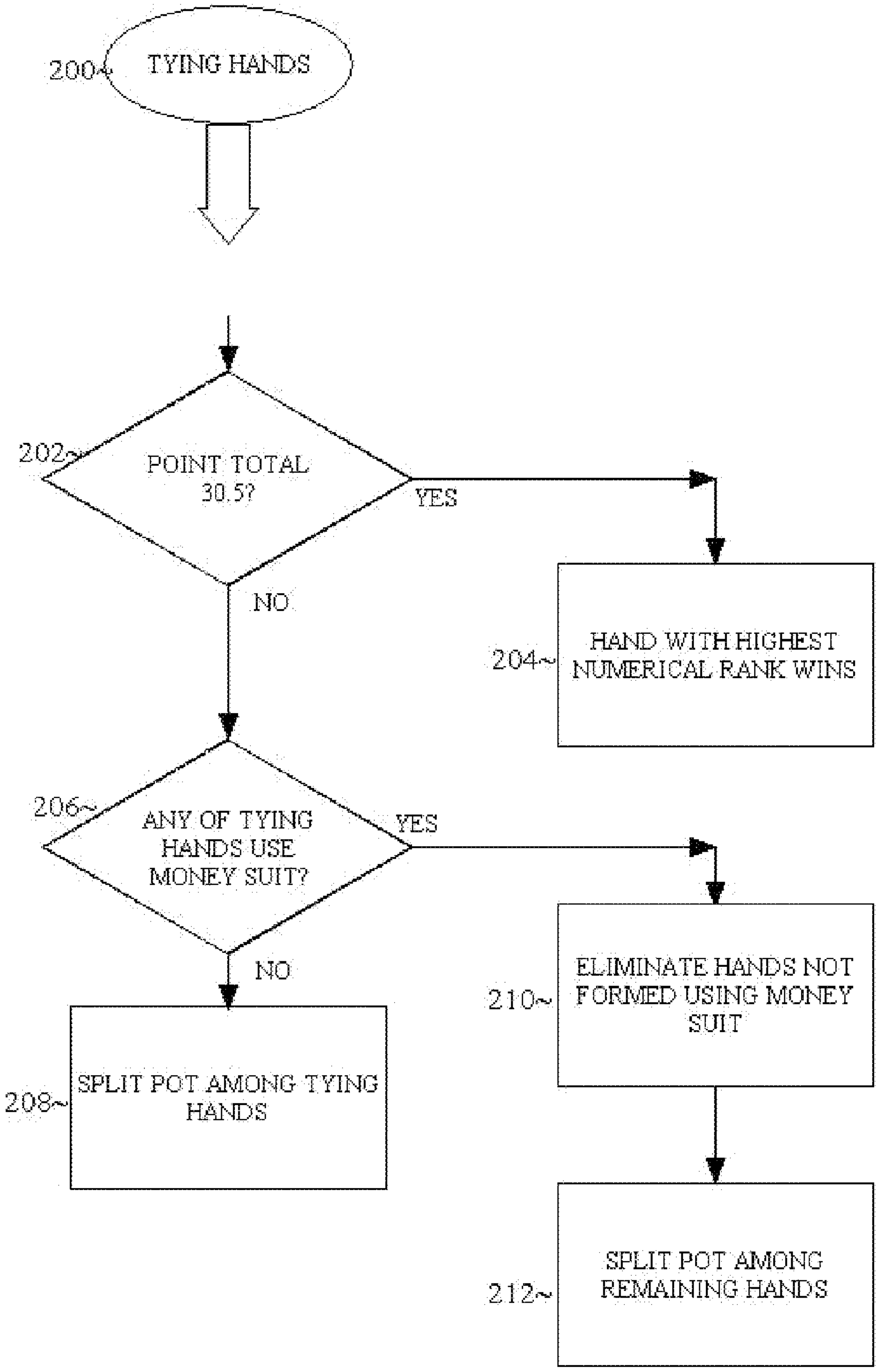
FIG. 2 is a flowchart illustrating an exemplary method of addressing ties, according to an embodiment.

FIG. 2 is a flowchart illustrating an exemplary method of addressing ties, according to an embodiment. The handling of ties for the resolution of the pot wager was described above, but to make this more clear this flowchart is presented. The operations in FIG. 2 are intended to be performed during operation 118 if a tie has occurred.

The tying hands 200 are the "input" for this method. The tying hands all have the highest numerical point total (score) from the game and are the same number.

The method can begin with operation 202, which determines if the tying numerical point total is 30.5, which would mean the tying hands are three of a kind. If so, the method proceeds to operation 204, wherein the tying hand with the highest numerical rank is the winner. Cards are ranked from lowest to highest as follows: (2, 3, 4, 5, 6, 7, 8, 9, 10, jack, queen, king, ace).

If in operation 202 it is determined that the tying score is not 30.5, then the method proceeds to operation 206, which determines whether any of the tying hands use (are formed with) the money suit. If not, then the method proceeds to operation 208, which splits the pot among all of the tying hands.

If in operation 206 it is determined that one or more of the tying hands are formed using the money suit, then the method proceeds to operation 210, which eliminates the hands from the tying hands (200) that are not formed using the money suit, resulting in remaining hand(s) which are formed using the money suit.

From operation 210, the method proceeds to operation 212, which splits the pot among the remaining hands determined in operation 210.

Figure 3A:
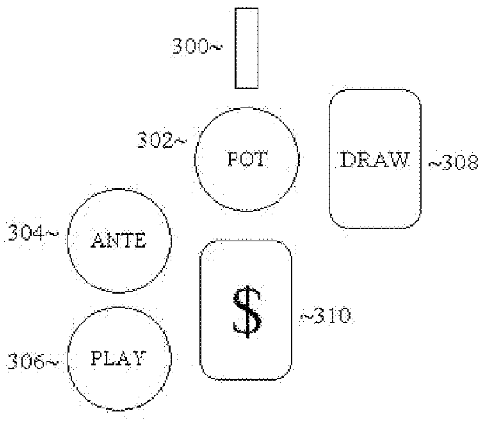
FIG. 3A is an exemplary playing layout for a single player, according to an embodiment.

FIG. 3A is an exemplary playing layout for a single player, according to an embodiment. It is noted that this is just one sample layout, and numerous other configurations can be used as well.

A progressive wager slot 300 is used to receive the player's progressive wager at the beginning of the game (operation 200). Once the wager is made (typically a dollar chip or coin), the coin can be mechanically dropped through a slot and collected in a collection box, while the player is given credit for making the progressive wager and thus making the player eligible to win the progressive jackpot. If the player does not make the progressive wager then the player is not eligible to win the progressive jackpot.

A pot wager betting circle 302 is where the player places his or her pot wager at the beginning of the game (operation 200). An ante wager betting circle 304 is where the player places his or her ante wager at the beginning of the game (operation 200). A play wager betting circle 306 is where the player places his or her play wager (operation 108). An initial hand area 310 is where the dealer will place the player's initial hand (operation 104). A draw area 308 is where the player will place the player's selected discard (in operation 110).

Figure 3B:
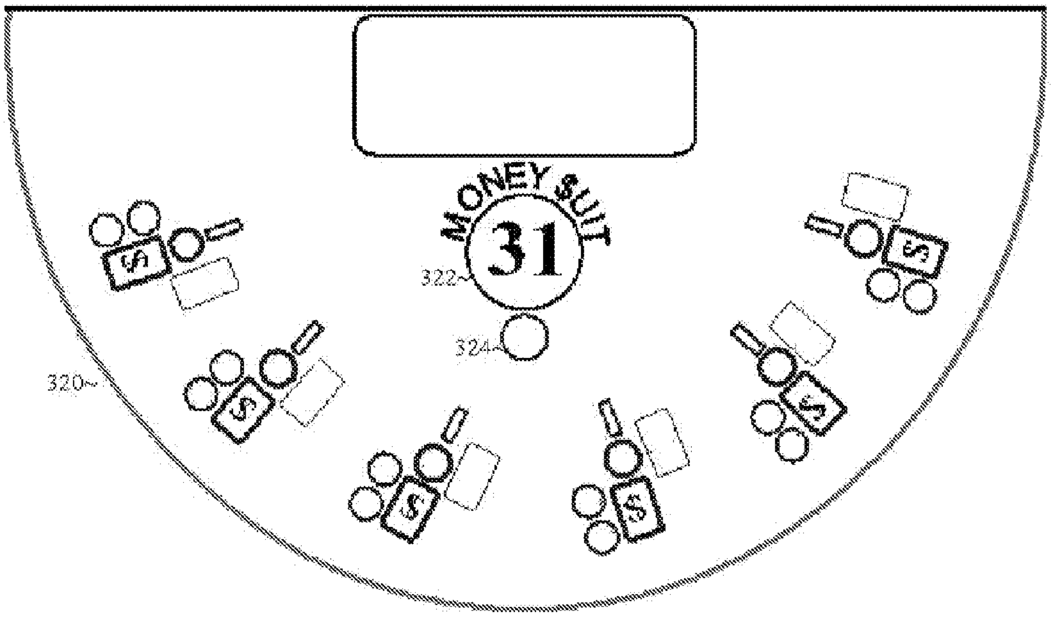
FIG. 3B is an exemplary table layout, according to an embodiment.

FIG. 3B is an exemplary table layout, according to an embodiment.

While the layout illustrated in FIG. 3B can accommodate up to six players, of course such a table can be designed to accommodate any number of players (e.g., 2-10). The table 320 is a standard gaming table as known in the art, with a felt layout on top which has the layouts embedded therein on the felt. A pot 322 is where the dealer will collect the players' individual pot wagers (placed in pot wager betting circle 302) and place them centrally in the pot 322. This can be done at any practical time, for example after operation 100. Display 324 is used to display to everyone at the table the automatically and randomly chosen money suit. The display 324 can be an LED display, LCD, or other electronic output form.

Figure 4:
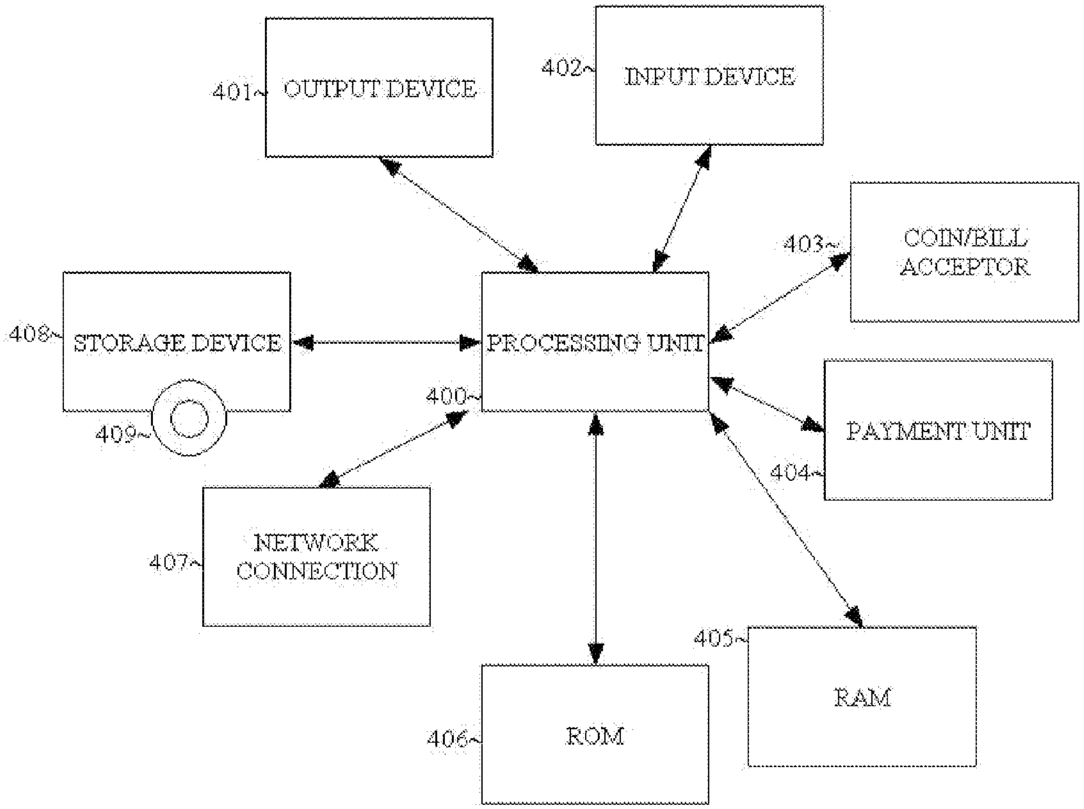
FIG. 4 is an exemplary block diagram illustrating sample hardware that can be used to implement an electronic version of the game, according to an embodiment.

FIG. 4 is an exemplary block diagram illustrating sample hardware that can be used to implement an electronic version of the game, according to an embodiment.

A processing unit 400 can be a microprocessor and associated structure (e.g., cache, bus, etc.) The processing unit 400 can be connected to an output device 401 which can be an LCD, CRT, touch-screen display, etc. The processing unit 400 can also be connected to an input device (e.g., touch-screen display, buttons, computer mouse, keyboard, etc.) The processing unit 400 can also be connected to a coin/bill acceptor 403 which can accept cash or cashless vouchers for play. The processing unit 400 can also be connected to a payment unit 404 which, upon cashout, can dispense physical coins as well as cashless vouchers for redemption for real cash. The processing unit 400 can also be connected to a ROM 406, a RAM 405, and a network connection 407 which can connect to a computer communications network such as the Internet, wifi, LAN, WAN, etc. The processing unit 400 can also be connected to a storage device 408 such as a CD-ROM drive, hard disk, EPROM, or any other volatile or nonvolatile type of storage. The storage device 308 can read a computer readable storage medium 409 such as a CD-ROM or hard disk, which can store instructions to control the processing unit 400 to perform any of the methods described herein (a computer program) along with any of the assets needed by such computer program (e.g., graphics filed, operating systems, etc.)

Figure 5A:
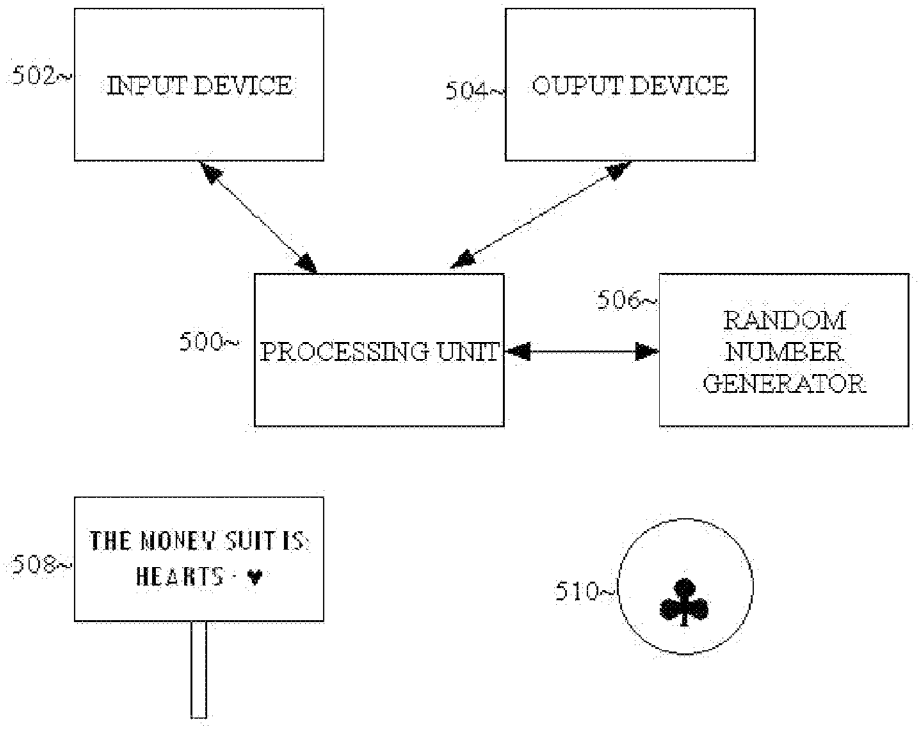
FIG. 5A is an exemplary block diagram of a random number generator used to select and output the money suit, according to an embodiment.

FIG. 5A is an exemplary block diagram of a random number generator used to select and output the money suit, according to an embodiment.

A processing unit 500 can be a microprocessor and any associated structure (e.g., cache, bus, etc.) The processing unit 500 can be connected to an input device 502 which can be a button that is pressed by the dealer when it is time for the random number generator to pick a new suit. The processing unit can also be connected to an output device 504 which can be an LCD or LED or other display which outputs the selected suit. The processing unit 500 can also be connected to a random number generator 506 which can be a module (either hardwired or coded in software) to pick a random number and map the random number into one of the four suits (hearts, diamonds, clubs, spades) so that each suit has an equal probability of appearing.

Sign 508 is one example of an output device 504, which can appear on a gaming table. Display 510 is another example of an output device 504 that can appear on the table (see FIG. 4B, display 324).

Figure 5B:
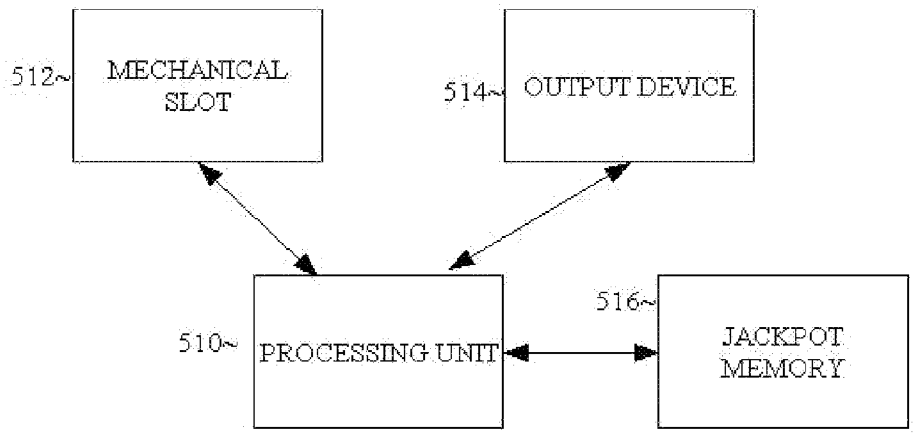
FIG. 5B is an exemplary block diagram of a progressive jackpot processor, according to an embodiment.

FIG. 5B is an exemplary block diagram of a progressive jackpot processor, according to an embodiment.

A processing unit 510 can be a microprocessor (and any associated structure, such as bus, cache, etc.) The processing unit 510 can be connected to a mechanical slot 512 such as progressive wager slot 300. The mechanical slot 512 can be opened by the processing unit 510 which can send the coin (or chip) inserted inside the mechanical slot 512 to a collecting container (not picture) using the force of gravity. The processing unit 510 is also connected to an output device 514 which displays the current amount of the progressive jackpot. The processing unit 510 will also adjust the amount of the progressive jackpot accordingly based on new wagers received. The processing unit 510 is also connected to a jackpot memory 516 which stores the current amount of the progressive jackpot.

FIG. 5B is a simplification of the progressive jackpot wagering system described in U.S. Pat. No. 6,234,895, which is incorporated by reference herein in its entirety. Such a system can be optionally used with the methods described herein in order to provide a progressive jackpot when the player is dealt predetermined hand(s).

An example of the game will now be presented to illustrate the game, using the payout illustrated in Table I. Of course, this is merely one example and it can be appreciated that a very large number of actual game instances can occur.

Joe, Roger, Larry, and Ralph each sit down at a table and each bet $1 on the pot wager, $1 on the ante wager, and $1 on the progressive wager. When all bets are placed, all the progressive wagers are collected by the house and all of the pot wagers are collected by the dealer and placed into a pot in the center of the table. The dealer presses a button on a random number generator which determines that the money suit is diamonds. Joe is dealt: 10 clubs/5 clubs/8 hearts. Roger is dealt: 9 spades/ace clubs/3 hearts. Larry is dealt: 5 hearts/3 clubs/2 diamonds. Ralph is dealt: 7 diamonds/4 diamonds/8 diamonds. Each player can only view their own cards at this point but cannot view the other players' cards.

It is Joe's turn first. Joe currently has a point total of 15 (using clubs). Joe decides to play, places a $1 play wager, and discards the 8 hearts. The dealer collects Joe's discard of 8 hearts and deals Joe a brand new card of 4 hearts. Joe's final point total is still 15. Since 15 is a losing point total according to Table I, Joe loses his ante wager and play wager. His pot wager is still live, though.

It is Roger's turn next. Roger decides to play and places a $1 play wager and discards the 3 hearts. The dealer collects Roger's 3 hearts and deals Roger a new card of 10 spades. This gives Roger a point total of 19 using spades. According to Table I, 19 is a winning total and pays even money on both the ante wager and the play wager. Thus Roger wins $2 (and also keeps his original $2 in wagers for a total of $4 in chips).

It is Larry's turn next. Larry has a point total of 5 using hearts. Larry decides to fold and does not place a play wager. Thus Larry loses his $1 ante wager. However, Larry's pot wager is still live.

It is now Ralph's turn. Ralph decides to play and places a $1 play wager. Ralph has a point total of 19 in diamonds. Ralph decides to keep all three of his initial cards and not replace any cards. According to Table I, 19 is a winning total and pays even money on both the ante wager and the play wager. Thus, Ralph wins $2 (in addition to keeping his original $2 in wagers for a total of $4 in chips).

Now the pot wagers are to be resolved, which means the pot is awarded to the player with the highest total. All cards are now turned face up (up until this point, each players cards were only viewable by the respective player). Roger and Ralph both tie for the highest point total (with 19). However, since the money suit is diamonds and Ralph's point total is made using diamonds, Ralph wins the entire pot. There are $4 in chips in the pot (since each of the four players placed a $1 pot wager bet), Ralph wins $4 (which includes his original $1 pot wager which is now in the pot).

None of the four players were dealt a jackpot hand (e.g., point total of 31 (does not use the money suit), a money suit 31 (uses the money suit), and a money suit mini royal) that would qualify them for the progressive jackpot, so none of the players is paid the progressive jackpot. The game is now over, the dealer collects all cards, and a new game can begin.

Any embodiments described herein can be played with a standard deck of cards or any type of special deck (e.g. a Spanish deck, etc.) The game can also be played with a single deck or multiple decks (e.g. 1-8 decks or more). Further, the order of any of the operations described herein can be performed in any order and wagers can be placed/resolved in any order. Any methods described herein can also be played in electronic form and programs and/or data for such can be stored on any type of computer readable storage medium (e.g. CD-ROM, DVD, disk, etc.)

Hands and cards are dealt to players randomly, and upon each new game the deck(s) would be typically shuffled.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for playing a wagering game, the apparatus comprising:
an electronic input device;
an electronic output device;
a processing unit connected to the input device and the output device, the processing unit configured to perform:
receiving an ante wager from a player;
determining a bonus suit randomly and displaying the bonus suit, the bonus suit being chosen out of a set of suits comprising spades, hearts, diamonds, clubs;
dealing cards from the deck(s) to the player which are part of a hand;
determining a point total of the hand, the point total being determined by adding card values in the hand of each suit to determine each suit's point total and the point total is a highest point total out of each suit's point total; and
paying the player a payout based on the point total,
wherein if a point total of card values in the hand for cards with the bonus suit is the point total and equals a particular point total, then the payout is higher than if the point total does not use the bonus suit.

2. The apparatus as recited in claim 1, further comprising, after the dealing, allowing the player to choose between: 1) folding and lose the ante wager; and 2) playing and making a play bet to continue in the game.

3. The apparatus as recited in claim 2, wherein the play bet must be equal in value to a value of the ante wager.

4. The apparatus as recited in claim 1, wherein the particular point total is 31.

5. The apparatus as recited in claim 1, wherein if a point total of card values in the hand for cards with the bonus suit is the point total and the point total is other amounts besides the particular point total, then the payout is higher than if the point total does not use the bonus suit.

6. The apparatus as recited in claim 1, further comprising, after the dealing and before the determining, allowing the player to replace none or one card in the hand with a replacement card.

7. The apparatus as recited in claim 1, wherein a point total for a hand comprising three of a kind is 30.5.

8. A method for playing a wagering game comprising:
providing an electronic random suit generator comprising a processing unit and an electronic output device, wherein the electronic random suit generator displays on the electronic output device a randomly determined suit;
receiving a pot wager from at least two players which all comprise a pot;
dealing cards to each of the at least two players which are part of each player's hand;
determining a bonus suit randomly using the electronic random number generator;
determining a point total for each player's hand, each point total being determined by adding card values in each hand of each suit to determine each suit's point total and the point total for each hand is a highest point total out of each suit's point total for each hand; and
determining winning player(s) which are the player(s) with a highest point total out of each hand dealt,
wherein if two or more players have the highest point total, then eliminating players with the highest point total whose hands do not use the bonus suit; and
awarding the pot to all remaining player(s) with the highest point total.

9. The method as recited in claim 8, further comprising, after the dealing and before the determining a point total for each hand, allowing the player to replace none or one card in the hand with a replacement card.

10. The method as recited in claim 8, further comprising receiving an ante wager from each player and resolving each player's ante wager based on each player's respective point total.

11. The method as recited in claim 10, further comprising receiving a play wager from each player who chooses to continue to play and resolving any play wagers placed based on each player's respective point total.

12. The method as recited in claim 10, further comprising: if a player's point total is made using the bonus suit then a payout made to the respective player is increased.

13. The method as recited in claim 8, wherein if there is more than one remaining player with the highest point total then the pot is divided equally among remaining players.

14. A method for playing a wagering game comprising:

providing an electronic random suit generator comprising a processing unit and an electronic output device, wherein the electronic random suit generator displays on the electronic output device a randomly determined suit;

receiving an ante wager from a player;

using the electronic random suit generator to determine and display a bonus suit;

dealing cards to the player which are used in a hand;

determining a point total of the hand, the point total being determined by adding card values in the hand of each suit to determine each suit's point total and the point total is a highest point total out of each suit's point total; and paying the player a payout based on the point total, wherein if a point total of card values in the hand for cards with the bonus suit is the point total and equals a particular point total, then the payout is higher than if the point total does not use the bonus suit.

15. The method as recited in claim 14, further comprising, after the dealing, allowing the player to choose between: 1) folding and lose the ante wager; and 2) playing and making a play bet to continue in the game.

16. The method as recited in claim 15, wherein the play bet must be equal in value to a value of the ante wager.

17. The method as recited in claim 14, wherein the particular point total is 31.

18. The method as recited in claim 14, wherein if a point total of card values in the hand for cards with the bonus suit is the point total and the point total is other amounts besides the particular point total, then the payout is higher than if the point total does not use the bonus suit.

19. The method as recited in claim 14, further comprising, after the dealing and before the determining, allowing the player to replace none or one card in the hand with a replacement card.

20. The method as recited in claim 14, wherein a point total for a hand comprising three of a kind is 30.5.

* * * * *